United States Patent

Ravier et al.

(12) United States Patent
(10) Patent No.: US 7,693,302 B2
(45) Date of Patent: Apr. 6, 2010

(54) DEVICE FOR DETECTING OBSTACLES COMPRISING AN IMAGING SYSTEM FOR MOTOR VEHICLES

(75) Inventors: Jean-Paul Ravier, Saint Maur des Fosses (FR); Jean-François Le Bars, Paris (FR); Benoit Reiss, Saint Gratien (FR); Joël Leleve, Epinay sur Seine (FR); Pierre Albou, Paris (FR)

(73) Assignee: Valeo Vision, Bobigny (FR)

( * ) Notice: Subject to any disclaimer, the term of this patent is extended or adjusted under 35 U.S.C. 154(b) by 922 days.

(21) Appl. No.: 11/419,231

(22) Filed: May 19, 2006

(65) Prior Publication Data

US 2007/0025596 A1 Feb. 1, 2007

(30) Foreign Application Priority Data

May 20, 2005 (FR) .................................. 05 05117

(51) Int. Cl.
*G06K 9/00* (2006.01)
(52) U.S. Cl. .................. 382/104; 382/103; 315/77; 348/148
(58) Field of Classification Search .............. 382/103, 382/104; 375/77; 348/148
See application file for complete search history.

(56) References Cited

U.S. PATENT DOCUMENTS

| 6,222,447 | B1 | 4/2001 | Schofield et al. | |
|---|---|---|---|---|
| 6,473,001 | B1 | 10/2002 | Blum | |
| 6,765,353 | B2 * | 7/2004 | Leleve | 315/77 |
| 6,819,231 | B2 | 11/2004 | Berberich et al. | |
| 6,920,234 | B1 | 7/2005 | Koenig et al. | |
| 2003/0122929 | A1 * | 7/2003 | Minaudo et al. | 348/148 |
| 2003/0214584 | A1 * | 11/2003 | Ross, Jr. | 348/148 |
| 2004/0136568 | A1 | 7/2004 | Milgram et al. | |
| 2004/0179098 | A1 | 9/2004 | Haehn et al. | |
| 2005/0030378 | A1 | 2/2005 | Stiller | |
| 2005/0146607 | A1 * | 7/2005 | Linn et al. | 348/148 |

FOREIGN PATENT DOCUMENTS

| EP | 0945305 | 9/1999 |
|---|---|---|
| EP | 1297511 | 4/2003 |
| EP | 1515293 | 3/2005 |
| FR | 2465612 | 7/1979 |
| FR | 2847367 | 5/2004 |
| FR | 2848935 | 6/2004 |
| FR | 2859860 | 3/2005 |

* cited by examiner

*Primary Examiner*—Tom Y Lu
(74) *Attorney, Agent, or Firm*—Jacox, Meckstroth & Jenkins

(57) ABSTRACT

An obstacle detection device comprising an imaging system for a motor vehicle, including at least one optical sensor, integrated in a lighting or signaling device of this vehicle. A field of vision of this at least one optical sensor can be oriented substantially along a longitudinal axis of the vehicle or substantially along a transverse axis of the vehicle.

15 Claims, 3 Drawing Sheets

DEVICE FOR DETECTING OBSTACLES COMPRISING AN IMAGING SYSTEM FOR MOTOR VEHICLES

BACKGROUND OF THE INVENTION

1. Field of the Invention

The present invention concerns devices for detecting obstacles, more particularly intended to equip motor vehicles, for warning the driver of their presence in the immediate vicinity of this vehicle or of the road that he will soon have to take.

2. Description of the Related Art

Many devices have already been proposed for resolving this problem of assisting the driving of motor vehicles, adapted to poor visibility conditions and based on imaging systems comprising one or more cameras on board the vehicle.

For example, the documents U.S. Pat. Nos. 6,819,231 and 6,222,447 propose disposing one or more cameras at the rear or on the sides of a vehicle in order to offer the driver a view of the rear of the vehicle or of the space situated in what is usually called the blind spot, in order to assist the drive in his maneuvers, for example parking.

The document U.S. Pat. No. 6,473,001 for its part proposes disposing a camera at the end of an extensible arm at the front and/or at the rear of the vehicle. Under the control of the driver, the arm unfolds and thus moves the camera away from the front or rear of the vehicle, so that the camera, oriented perpendicular to the longitudinal axis of the vehicle, can laterally explore the scenes situated at each side of the front or rear of the vehicle, a screen in the cabin presenting these scenes to the driver. When the maneuvers of entering or leaving parking are ended and the driver stops the vehicle or begins to build up speed, the arm is refolded into the idle position in order to preserve it from impacts.

The document FR-A-2 859 860 proposes an obstacle-detection device comprising a stereoscopic imaging system, including two optical sensors integrated in the lighting or signaling means of the vehicle, the sensors being thus distant from each other by more than one meter and supplying information on the obstacle presented and on its distance in front of the vehicle.

The document FR-A-2 848 935 describes a method of detecting bends on a road, comprising a camera mounted in the vehicle, an image signal processing unit and a neural network, in order to display on a display screen the contours of the road situated in front of the vehicle.

In the same light, the document FR-A-2 847 367 proposes a device for determining the visibility distance in front of a vehicle, using a camera mounted in the vehicle, an image signal processing unit and a display screen for the results calculated by the device from the data collected.

It is thus known how to dispose a camera in a vehicle in order to transmit to the driver, with or without processing of the image signals, information and/or alerts on his immediate environment. However, these cameras are devolved to a given type of observation and fulfill only one function. In addition, they are for the majority of the time disposed behind the windscreen, for example level with the central rear view mirror, and thus occupy a not insignificant space in the field of vision of the driver.

SUMMARY OF THE INVENTION

The present invention is situated in this context and its aim is to propose a device for detecting obstacles in the environment or vicinity of the vehicle, comprising an imaging system whose sensor, for example a camera, is not an impediment for the driver, and can fulfill several functions, and supply to a display situated in the cabin video images of the environment of the vehicle or digital images or alerts obtained after processing of the image signals.

The object of the invention is therefore an obstacle detection device comprising an imaging system for motor vehicles, including at least one optical sensor, integrated in a lighting or signaling device of this vehicle.

According to the present invention, the field of vision of the sensor can be oriented substantially along the longitudinal axis of the vehicle or substantially along the transverse axis of the vehicle.

According to other characteristics of the various embodiments:

- a sensor is mounted to as to be able to move in rotation about a vertical axis, between a first position in which its field of vision is oriented substantially along the longitudinal axis of the vehicle and a second position in which its field of vision is oriented substantially along the transverse axis of the vehicle;
- a sensor is fixed with respect to the vehicle, a deviation device being disposed in front of the sensor;
- the deviation device consists of a tilting mirror;
- the mirror is mounted so as to be able to move in rotation about a vertical axis, between a first position in which it is retracted, the field of vision of the sensor being oriented substantially along the longitudinal axis of the vehicle, and a second position in which it is inclined by 45° with respect to the longitudinal axis of the vehicle, the field of vision of the sensor being oriented substantially along the transverse axis of the vehicle;
- the deviation device consists of an electro-optical device;
- the electro-optical device is able to change from a reflecting state to a transparent state under the effect of an electrical field;
- in the reflecting state, the field of vision of the sensor is oriented substantially along the transverse axis of the vehicle, and in the transparent state the field of vision of the sensor is oriented substantially along the longitudinal axis of the vehicle;
- in the transparent state, the field of vision of the sensor is oriented substantially along the transverse axis of the vehicle, and in the reflecting state the field of vision of the sensor is oriented substantially along the longitudinal axis of the vehicle;
- the change in orientation of the field of vision of the sensor is effected manually;
- the change in orientation of the field of vision of the sensor is effected automatically as a function of the speed of the vehicle;
- the field of vision is oriented substantially along the transverse axis of the vehicle for a speed thereof less than a predetermined value, and the field of vision is oriented substantially along the longitudinal axis of the vehicle for a speed thereof greater than the predetermined value;
- the sensor is a video camera;
- the sensor is a CMOS or CCD sensor;
- the sensor is associated with an image signal processing system.

These and other objects and advantages of the invention will be apparent from the following description, the accompanying drawings and the appended claims.

BRIEF DESCRIPTION OF THE DRAWINGS

Other aims, characteristics and advantages of the present invention will emerge clearly from the following description that will now be made of an example embodiment given non-limitingly with reference to the accompanying drawings, in which.

DETAILED DESCRIPTION OF REPRESENTATIVE EMBODIMENTS

By convention, in the present description, "front" refers to the normal direction of forward progression of the vehicle, and "rear" the opposite direction. In the figures, the front is thus at the bottom in these figures and the rear at the top.

Figure 1:
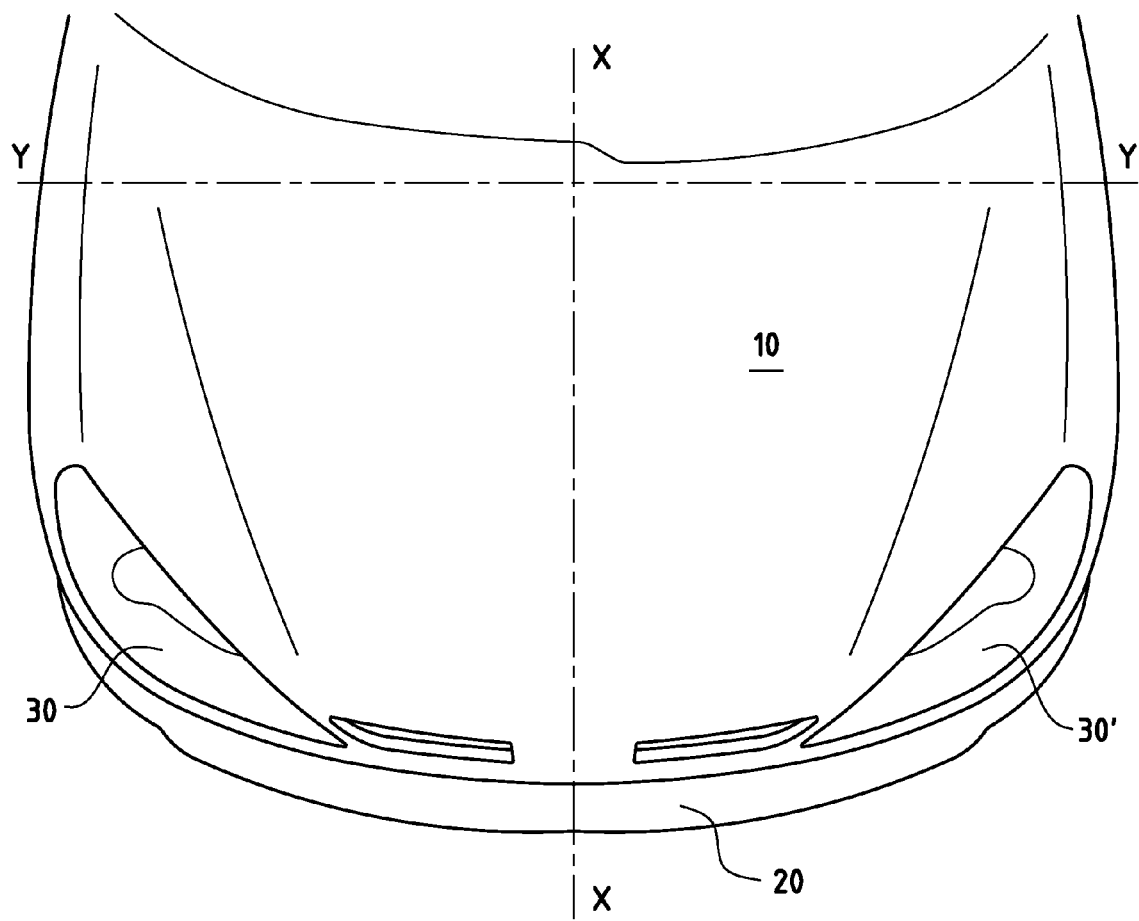
FIG. 1 depicts a schematic plan view of the front part of a vehicle.

FIG. 1 depicts schematically the front of a vehicle, with longitudinal axis XX and transverse axis YY, and in particular its front bonnet 10, its bumpers or spoiler 20 and its lighting and signaling devices, right and left 30 and 30' respectively.

In accordance with the present invention, an obstacle detection device is disposed on this vehicle, and more precisely in its lighting or signaling devices. FIGS. 2 to 5 depict one of these devices, for example the right-hand headlight 30 of the vehicle. This headlight comprises a housing 32, a closure lens 34 and optical systems (not shown for reasons of clarity) fulfilling various regulatory lighting functions, such as the emission of dipped, main or fog light beams, and signaling, such as the emission of daytime running light beams, change of direction or sidelights.

With regard to dipped beams in particular, which comprise a cutoff, that is to say a top limit above which very few light rays are emitted, optical systems capable of generating these cutoff beams by themselves, without the help of serrations on the closure lens 34, have been developed for several years. The closure lens may therefore be smooth, that is to say not deviating or only slightly deviating, and may make it possible to see, from the outside of the headlight, all its components. It is therefore usual to use a mask such as mask 36, that is to say a style part intended to be interposed between the various optical systems in order to conceal the very inside of the lighting or signaling device. Such a mask 36 is usually aluminized, so as to harmonize with the reflectors of the optical systems.

The use of a smooth lens is taken advantage of in the present invention in order to dispose behind this lens 34 an obstacle detection device or sensor 38 according to the invention. Such an obstacle detection device 38 advantageously consists of a video camera but can just as well consist of a CCD or CMOS sensor. The obstacle detection device 38 is thus disposed in the lighting or signaling device, behind the smooth lens 34, and partly concealed by the mask 36.

Figure 2:
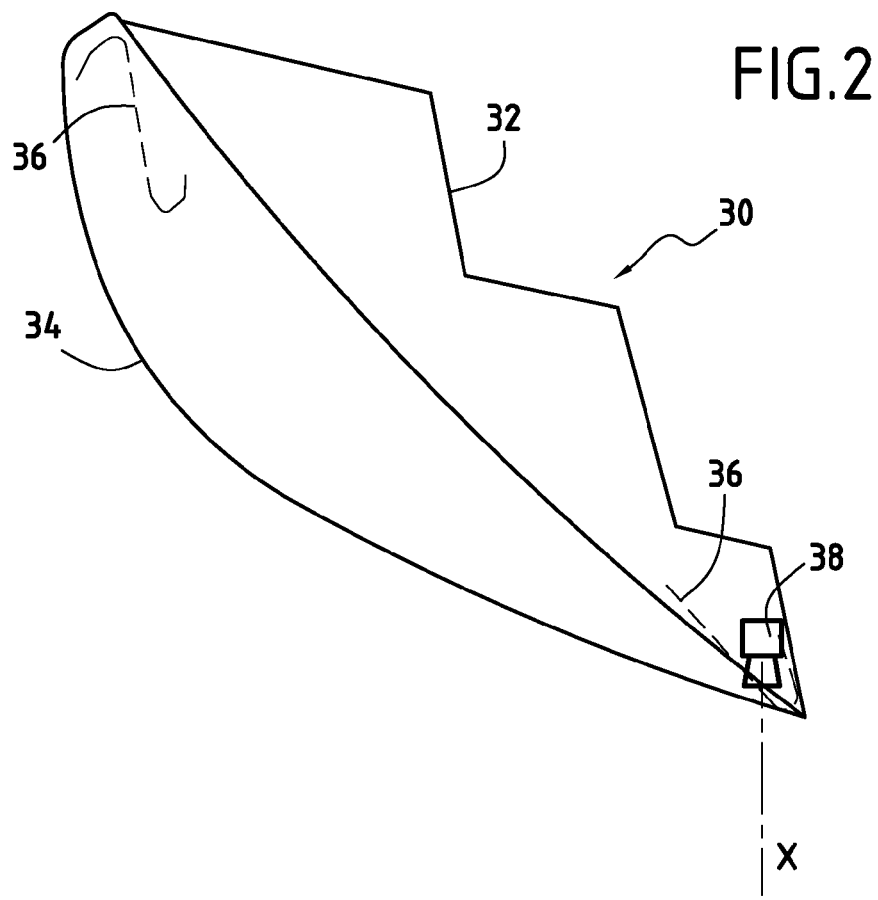
FIG. 2 depicts a schematic view of a lighting or signaling device for the vehicle in FIG. 1 equipped with a device according to the present invention, in a first position.

In a first position depicted in FIG. 2, the obstacle detection device 38 has its field of vision oriented along the longitudinal axis XX of the vehicle. In this position the obstacle detection device observes the environment in front of the vehicle and can for example be used to form a stereoscopic imaging system in association with the sensor disposed in the lighting or signaling device situated symmetrically on the left-hand side of the vehicle, or as a sensor of a device for determining the visibility distance in front of the vehicle.

Figure 3:
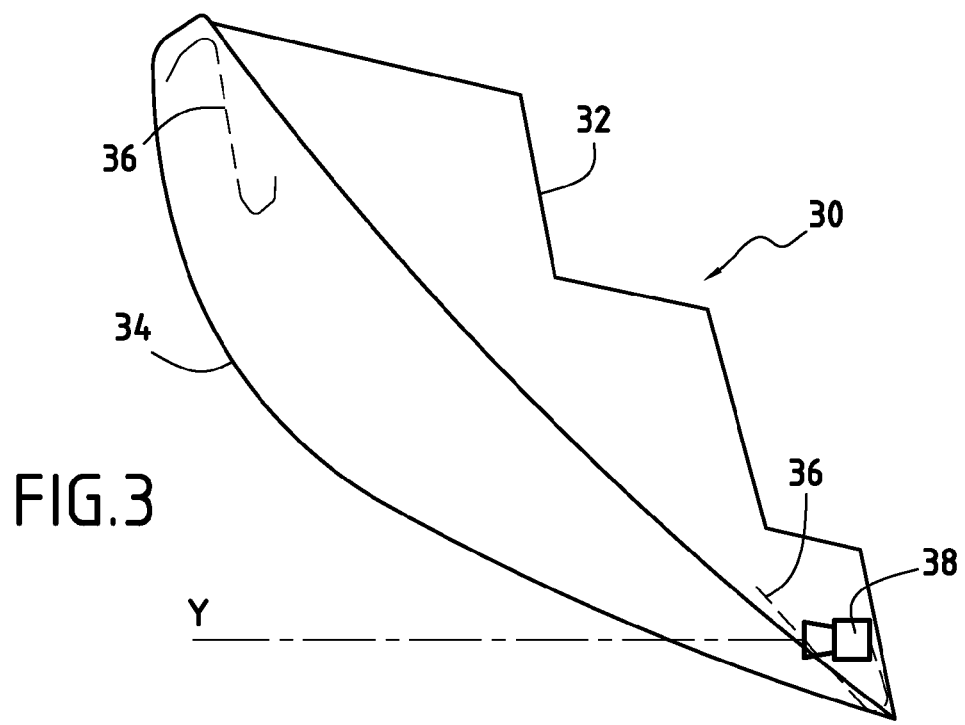
FIG. 3 depicts a schematic view similar to that in FIG. 2, the device of the invention being in a second position.

In a second position depicted in FIG. 3, the obstacle detection device 38 has its field of vision oriented perpendicular to the longitudinal axis of the vehicle, that is to say along the axis YY. In this position, the obstacle detection device 38 observes the environment of the vehicle in front of and to the right of the latter. It can thus provide to the driver information on this environment and thus help him in his maneuvers of entering or leaving a parking place. This is because, on leaving for example a garage, the front of the vehicle must be engaged by approximately the length of its bonnet before the driver can have view of the space in which he has the intention to engage. Obstacles such as pedestrians or other vehicles travelling on the perpendicular path in which the vehicle is engaging can be seen only very late, which may prove to be a dangerous maneuver and result in accidents involving material damage and bodily injury.

The obstacle detection device 38 according to the invention enables the driver to assess this environment on a display screen (not shown), disposed in the cabin, for example on the dashboard, and to take suitable decisions well before he has direct vision thereof, that is to say whilst his vehicle is scarcely engaged in this transverse path: he can continue his maneuver in complete safety or he waits until the obstacle has left the immediate environment.

In order to pass from the first position to the second position, the sensor 38 is mounted so as to be able to move in rotation about a vertical axis and is actuated by a motor (not shown), the control for which can be situated on the dashboard. The motor can also be controlled automatically, according to the speed of the vehicle: below a predetermined speed, for example 5 km/h, the sensor 38 is directed along the axis YY. Above this speed, the sensor 38 is automatically oriented along the axis XX.

Figure 4:
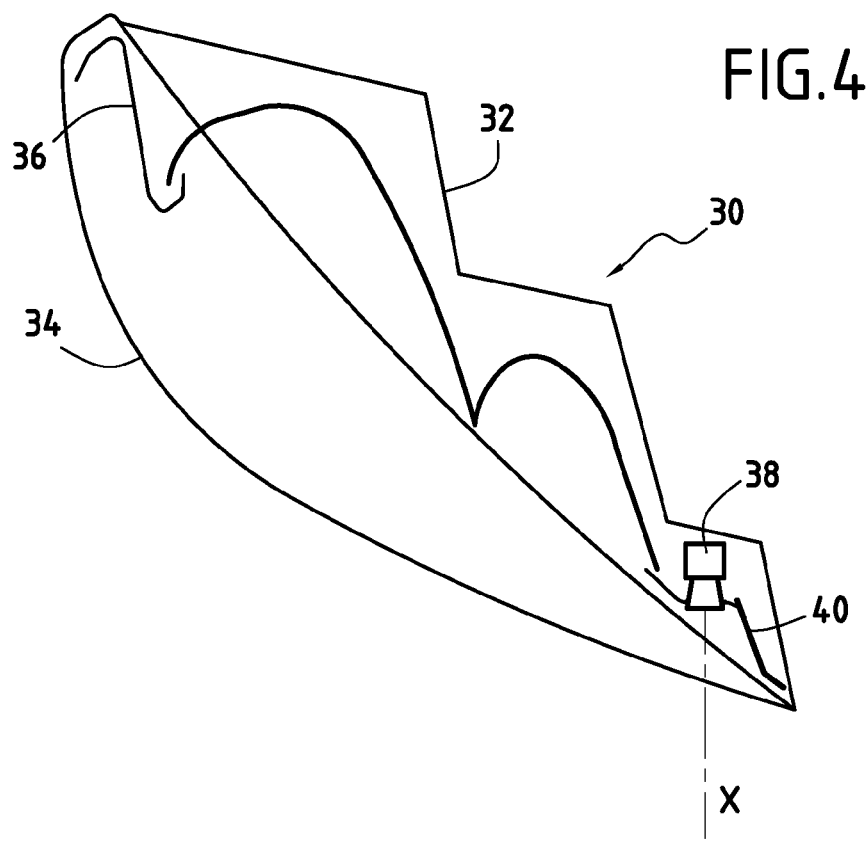
FIG. 4 depicts a schematic view of a lighting or signaling device for the vehicle in FIG. 1, according to a second embodiment of the device according to the present invention, in a first position.
Figure 5:
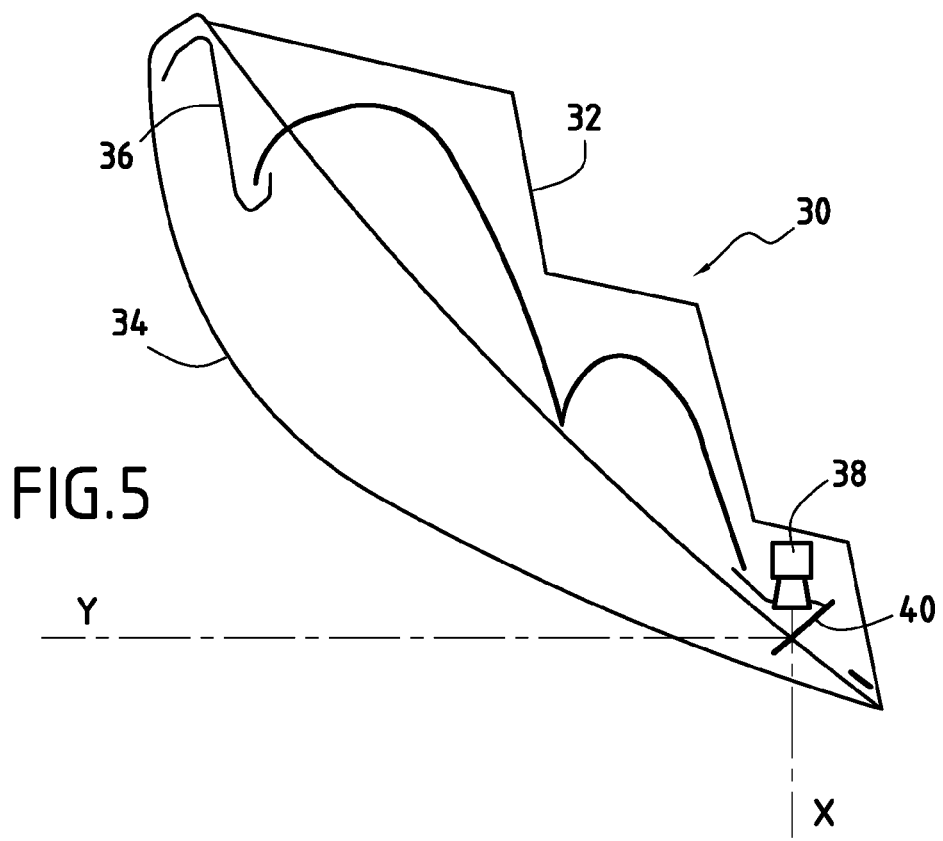
FIG. 5 depicts a schematic view similar to that in FIG. 4, the device of the invention according to this embodiment being in a second position.

FIGS. 4 and 5 depict a second embodiment of the obstacle detection device that has just been described. According to this embodiment, the sensor 38 is fixed with respect to the vehicle and oriented along the longitudinal axis XX of the vehicle, and a deviation device 40 is disposed in front of the sensor 38. The function of such a deviation device 40 is to modify the orientation of the field of vision of the sensor 38 whilst leaving the latter immobile.

In the example depicted in FIGS. 4 and 5, such a deviation device consists of a tilting mirror 40, disposed in front of the sensor 38. In the first position depicted in FIG. 4, the mirror 40 is retracted and the sensor 38 has a direct view of the environment in front of the vehicle.

In the second position depicted in FIG. 5, the mirror 40 has made a rotation of 45° about a vertical axis so as to be situated in front of the sensor 38 and so that the field of vision of the latter is oriented along the axis YY. As in the previous embodiment, the control of the tilting of the mirror 40 can be manual by means of a switch on the dashboard or automatic according to the speed of the vehicle.

In a variant, the deviation device 40 is fixed and consists of an electro-optical material, changing from a reflecting state to a transparent state under the effect of an electrical field. The electro-optical deviation device 40 then occupies the fixed position depicted in FIG. 5.

When the electro-optical device 40 is transparent, the field of vision of the sensor 38 is oriented along the longitudinal axis XX of the vehicle, depicted by a dot and dash line, and when the electro-optical device 40 is reflecting, the field of vision of the sensor 38 is oriented along the transverse axis YY of the vehicle depicted in dashed line.

It is of course possible to dispose the sensor 38 along the transverse axis YY of the vehicle so that, when the electro-optical device 40 is transparent, the field of vision of the sensor 38 is oriented along the transverse axis YY of the vehicle, and when the electro-optical device 40 is reflecting, the field of vision of the sensor 38 is oriented along the longitudinal axis XX of the vehicle.

The information supplied by the obstacle detection device can be different according to the orientation of the field of vision of the sensor 38: when its field of vision is oriented along the transverse axis YY of the vehicle, it can for example supply a video image of the front lateral environment of the vehicle, and when it is oriented along the longitudinal axis XX of the vehicle, it can give information shaped by a system for processing the image signals supplied by the sensor 38. This difference in retrieval of the driver of the signal supplied by the sensor 38 can be provided automatically according to the direction of orientation of the field of vision.

An obstacle detection device has therefore indeed been produced whose sensor is not an interference for the driver, since it is placed in the vehicle lighting or signaling devices. Such an obstacle detection device can fulfill several functions: it supplies for example video images of the front lateral environment of the vehicle when its field of vision is oriented along the transverse axis YY of the vehicle, and information that has undergone image signal processing when the field of vision of the sensor is oriented along the longitudinal axis XX of the vehicle.

In addition, being situated in the vehicle lighting or signaling devices, the sensor benefits from this cohabitation: the drawbacks of the condensation encountered on the internal face of the windscreens or on the lenses of cameras are simply non-existent, the lighting or signaling devices being ventilated and having anti-mist lacquer. The headlights 30 and 30' can be cleaned in an identical manner to the windscreen, by virtue of headlight washers; thus the lenses of the right and left cameras are not disturbed by any soiling.

Naturally the present invention is not limited to the embodiments that have been described, but a person skilled in the art will on the contrary make to it many modifications which come within its scope. Thus the orientation of the field of vision of the sensor may not be strictly parallel or perpendicular to the transverse axis of the vehicle but may be slightly inclined with respect to this axis and/or to its perpendicular. Likewise, in the case of the use of a device for deviating the orientation of the field of vision of a fixed sensor with respect to the vehicle, the position of this sensor with respect to the vehicle can be any position, the only important thing being the orientation of its field of vision by virtue of the deviation device. For example, the sensor can be disposed horizontally, vertically or in any other position according to the size constraints.

While the forms of apparatus herein described constitute preferred embodiments of the invention, it is to be understood that this invention is not limited to these precise forms of apparatus, and that changes may be made therein without departing from the scope of the invention which is defined in the appended claims.

What is claimed is:

1. A detection device comprising an imaging system for a motor vehicle, including at least one optical sensor integrated in a lighting or signaling device for this vehicle, wherein a field of vision of the at least one optical sensor can be oriented substantially along a longitudinal axis of the vehicle or substantially along a transverse axis of the vehicle; and a deviation device situated in operative relationship of said at least one optical sensor, said deviation device being moveable from a first position at which said at least one optical sensor captures an image in a direction of said longitudinal axis and a second position at which said at least one optical sensor captures an image in a direction of said transverse axis.

2. A detection device comprising an imaging system for a motor vehicle, including at least one optical sensor integrated in a lighting or signaling device for this vehicle, wherein the field of vision of the at least one optical sensor can be oriented substantially along a longitudinal axis of the vehicle or substantially along a transverse axis of the vehicle;

wherein said at least one optical sensor is mounted to as to be able to move in rotation about a vertical axis between a first position in which its field of vision is oriented substantially along said longitudinal axis of the vehicle and a second position in which its field of vision is oriented substantially along said transverse axis of the vehicle.

3. The device according to claim 1, wherein said at least one optical sensor is fixed with respect to the vehicle, a deviation device being disposed in front of the at least one optical sensor.

4. A detection device comprising an imaging system for a motor vehicle, including at least one optical sensor integrated in a lighting or signaling device for this vehicle, wherein the field of vision of the at least one optical sensor can be oriented substantially along a longitudinal axis of the vehicle or substantially along a transverse axis of the vehicle;

wherein said at least one optical sensor is fixed with respect to the vehicle, a deviation device being disposed in front of the at least one optical sensor;

wherein said deviation device consists of a tilting mirror.

5. The device according to claim 4, wherein said tilting mirror is mounted so as to be able to move in rotation about a vertical axis between a first position in which it is retracted, said field of vision of said at least one optical sensor being oriented substantially along the longitudinal axis of the vehicle and a second position in which it is inclined by at about 45° with respect to the longitudinal axis of the vehicle such that the field of vision of the at least one optical sensor being oriented substantially along the transverse axis of the vehicle.

6. A detection device comprising an imaging system for a motor vehicle, including at least one optical sensor integrated in a lighting or signaling device for this vehicle, wherein the field of vision of the at least one optical sensor can be oriented substantially along a longitudinal axis of the vehicle or substantially along a transverse axis of the vehicle;

wherein said at least one optical sensor is fixed with respect to the vehicle, a deviation device being disposed in front of the at least one optical sensor;

wherein said deviation device consists of an electro-optical device.

7. The device according to claim 6, wherein said electro-optical device is able to change from a reflecting state to a transparent state under the effect of an electrical field.

8. The device according to claim 7, wherein, in said reflecting state, the field of vision of said at least one optical sensor is oriented substantially along the transverse axis of the vehicle, and in that in said transparent state, the field of vision of said at least one optical sensor is oriented substantially along the longitudinal axis of the vehicle.

9. The device according to claim 7, wherein, in the transparent state, the field of vision of said at least one optical sensor is oriented substantially along the transverse axis of the vehicle, and in that in the reflecting state, the field of vision of said at least one optical sensor is oriented substantially along the longitudinal axis of the vehicle.

10. The device according to claim 1, wherein the change in orientation of said field of vision of said at least one optical sensor is effected manually.

11. A detection device comprising an imaging system for a motor vehicle, including at least one optical sensor integrated in a lighting or signaling device for this vehicle, wherein the field of vision of the at least one optical sensor can be oriented substantially along a longitudinal axis of the vehicle or substantially along a transverse axis of the vehicle;
  wherein the change in orientation of said field of vision of said at least one optical sensor is effected automatically as a function of a speed of the vehicle.

12. The device according to claim 11, wherein said field of vision is oriented substantially along the transverse axis of the vehicle for a speed thereof less than a predetermined value, and the field of vision is oriented substantially along the longitudinal axis of the vehicle for a speed thereof greater than said predetermined value.

13. The device according to claim 1, wherein said at least one optical sensor is a video camera.

14. The device according to claim 1, wherein said at least one optical sensor is a CMOS or CCD sensor.

15. The device according to claim 1, wherein said at least one optical sensor is coupled to an image signal processing system.

\* \* \* \* \*